April 30, 1963 O. W. BONNAFE 3,087,389
VERTICAL BROACH
Filed March 18, 1960 12 Sheets-Sheet 1

INVENTOR.
Oliver W. Bonnafe
BY
Roberts, Cushman & Grover
ATT'YS

April 30, 1963 O. W. BONNAFE 3,087,389
VERTICAL BROACH
Filed March 18, 1960 12 Sheets-Sheet 2
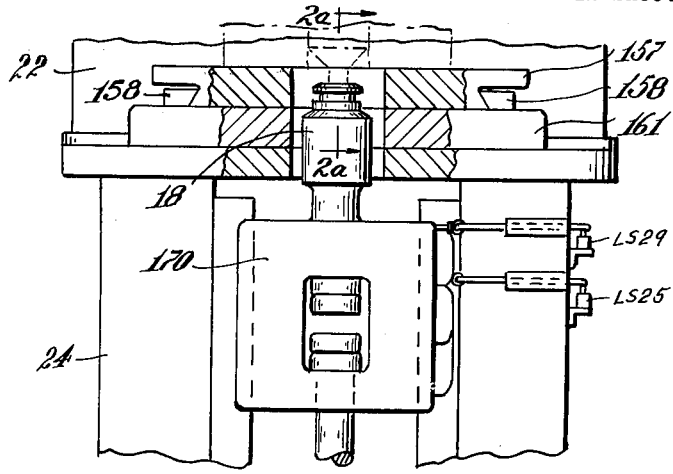
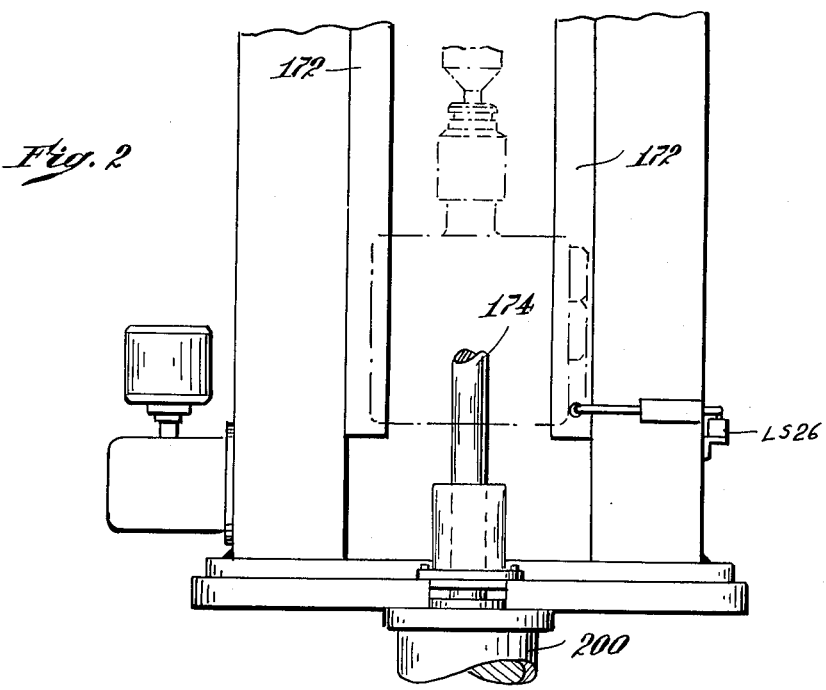
Fig. 2
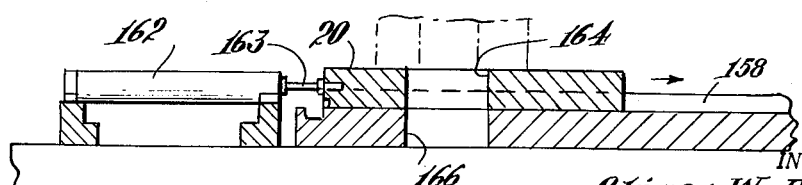
Fig. 2a
INVENTOR.
Oliver W. Bonnafe
BY
Roberts, Cushman & Grover
ATT'YS April 30, 1963 O. W. BONNAFE 3,087,389
VERTICAL BROACH Filed March 18, 1960 12 Sheets-Sheet 3

INVENTOR.
Oliver W. Bonnafe
BY
Roberts, Cushman & Grover
ATT'YS

April 30, 1963   O. W. BONNAFE   3,087,389
VERTICAL BROACH
Filed March 18, 1960   12 Sheets-Sheet 4

INVENTOR.
Oliver W. Bonnafe
BY
Roberts, Cushman & Grover
ATT'YS

April 30, 1963 O. W. BONNAFE 3,087,389
VERTICAL BROACH
Filed March 18, 1960 12 Sheets-Sheet 5

INVENTOR.
Oliver W. Bonnafe
BY
Roberts, Cushman & Grover
ATT'YS

INVENTOR.
Oliver W. Bonnafe
BY
Roberts, Cushman & Grover
ATT'YS

April 30, 1963    O. W. BONNAFE    3,087,389
VERTICAL BROACH

Filed March 18, 1960    12 Sheets-Sheet 7

INVENTOR.
Oliver W. Bonnafe
BY Roberts, Cushman & Grover
ATT'YS

3,087,389
VERTICAL BROACH
Oliver W. Bonnafe, Hudson, Mass., assignor to The Lapointe Machine Tool Company, Hudson, Mass., a corporation of Maine
Filed Mar. 18, 1960, Ser. No. 15,900
20 Claims. (Cl. 90—91)

This invention relates to broaching machines, and has for its principal objects to provide a machine for supporting a plurality of long heavy broaches, for movement in unison to advance each one in turn to an operative position; to provide a machine in which such movement may be effected rapidly throughout the greater part of the distance between broaches, decelerated during the latter part of the movement and brought to a stop with a broach next to be used accurately aligned with a carriage adapted to move it into engagement with a puller, for pulling it through the work without undue strain on the driving means and without jolt; to provide a machine in which each working cycle is initiated manually, but is carried through to completion automatically; to provide a machine in which all of the broaches may be used successively, or in which only part of the broaches may be used, or in which certain broaches in a series may be used and others excluded; to provide a machine in which the broaches may be turned about their longitudinal axes to dispose their cutting edges at different angles with respect to the work to be operated upon; to provide a machine in which each broach is disengaged from its support at the operative position and lowered into engagement with the puller without impact; to provide a machine in which the cutting speed may be preselected according to the character of the work; and to provide a machine which is easy to set up for operation and to operate, economical of power and substantially foolproof.

As herein illustrated, the machine has a vertically disposed frame supporting a circular track on which a plurality of hangers are mounted, each of which is adapted to hold a broach in suspension and an index table rotatable thereon to effect movement of the hangers along the track, toward a carriage also supported by the frame. Movement is imparted to the hangers by pins fastened to the underside of the index table, the lower ends of which extend downwardly into engagement with the upper ends of holes in the hangers. The means for effecting movement of the table includes a worm wheel fast to the table, a worm engaged therewith, and a hydraulic motor coupled to the worm to effect rotation thereof. There is means for supplying fluid pressure to the hydraulic motor to impart rapid indexing to the table, means carried by the table, selectively operable as the broaches approach operative position, to decelerate rotation of the table, and interlocking means associated with the driving coupling, and other means associated with the table to bring the table to a stop with the hanger situated on the carriage in a position to be locked thereto.

Each of the broaches is suspended so as to be rotatable about its longitudinal axis and is normally held by a spring-pressed detent, with its cutting edge in a predetermined position, so that all of the broaches occupy the same position as they move along the track. There is means adjacent the carriage, however, which may be preset to rotate each broach as it moves into operative position to turn the broach through a predetermined angle relative to its initial position as it moves onto the carriage, and there is other means at the far side of the carriage to rotate the broach back to its initial position as it leaves the carriage.

The carriage has on it a locking pin movable into the lower end of the hole in the hanger, while the pin on the carriage still occupies the upper end of the hole, and there is means operable, by engagement of the pin with the hole, to initiate downward movement of the carriage, thereby disengaging the pin from the upper end of the hole and actuate means for preventing further rotation of the table until the carriage has been returned to its initial position. There is a support below the carriage upon which work to be operated upon is clamped and the broach puller is vertically movable to a position at the underside of the work support to engage the lower end of the broach as the latter is moved downwardly through the work, by downward movement of the carriage. Hydraulic motors are employed to effect movement of the carriage and the broach puller relative to each other, and there is means for controlling the movement of the carriage and puller, so that, as the lower end of the broach enters the puller, the puller jaws close on the end of the broach and the puller then moves downwardly with the carriage, thereby guiding the broach. There is also means for controlling the supply of pressure fluid to the hydraulic motors so as to use the combined pressure developed by the motors, or only a part thereof, for moving the puller, thereby to vary the cutting speed.

The invention will now be described in greater detail with reference to the accompanying drawings wherein:

FIG. 2 is an elevation of that part of the machine below floor level;

FIG. 2a is a side elevation taken on the line 2a—2a of FIG. 2, showing the work support;

Figure 3:
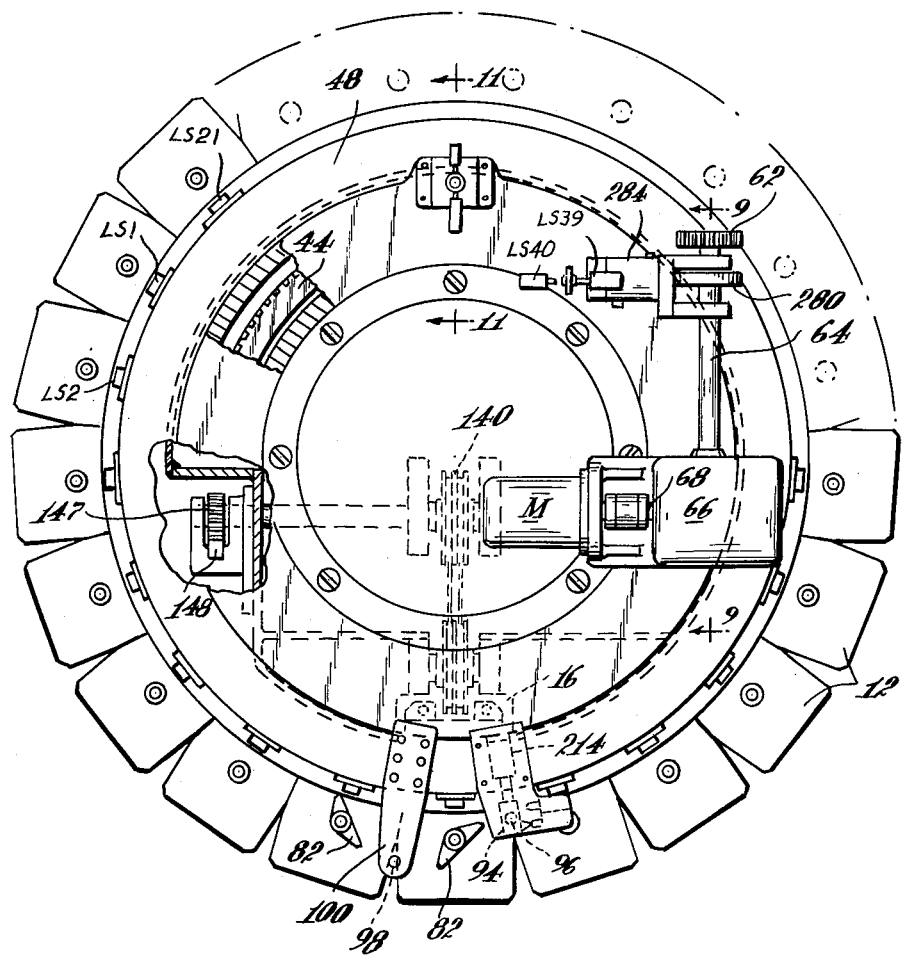
FIG. 3 is a plan view of the top of the machine partly in section.
Figure 5:
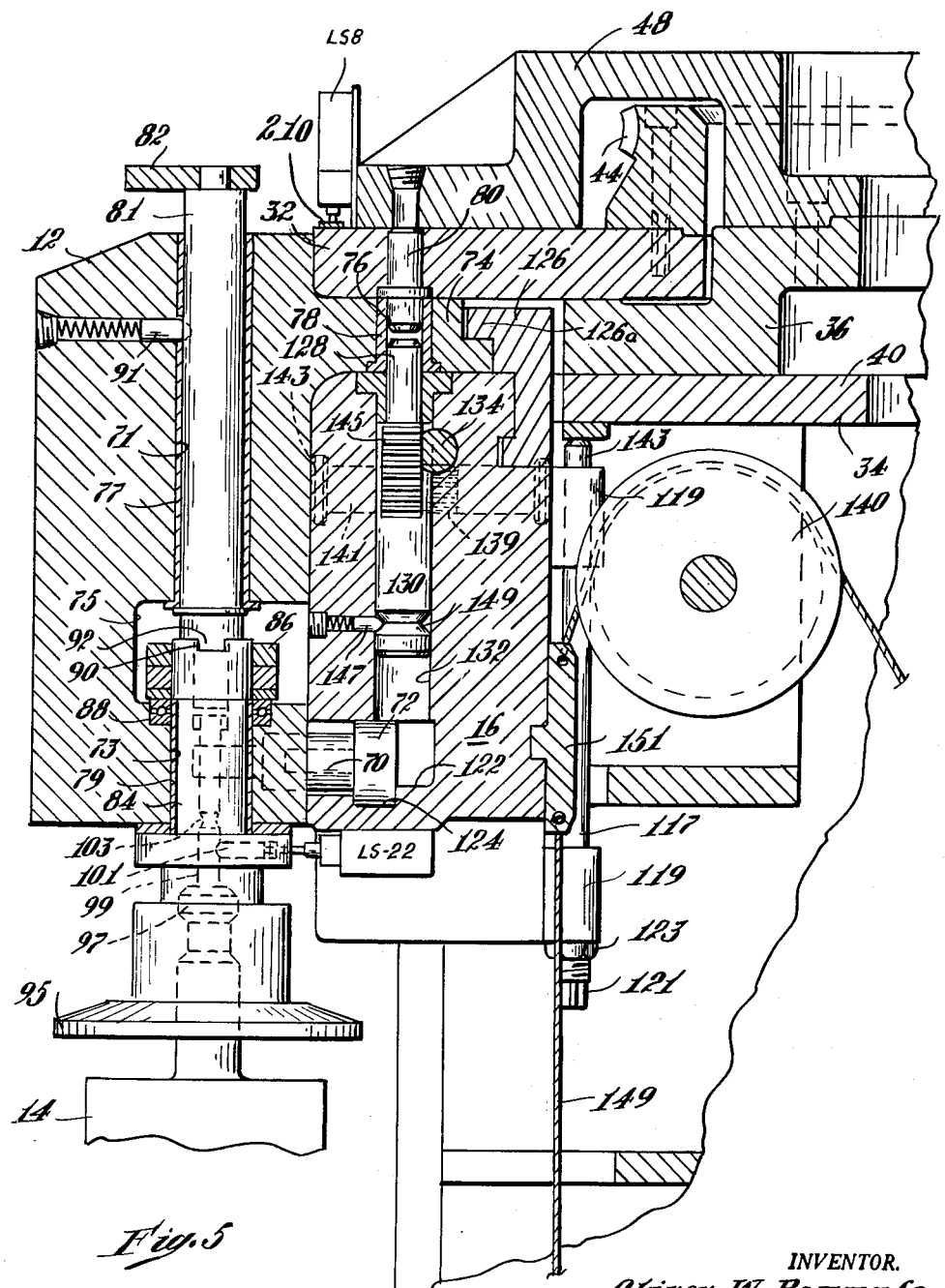
FIG. 5 is a fragmentary vertical section taken diametrically of the machine, from front to back, showing a broach hanger on the carriage, by means of which the broach may be moved in elevation, with the carriage in its uppermost position.
Figure 6:
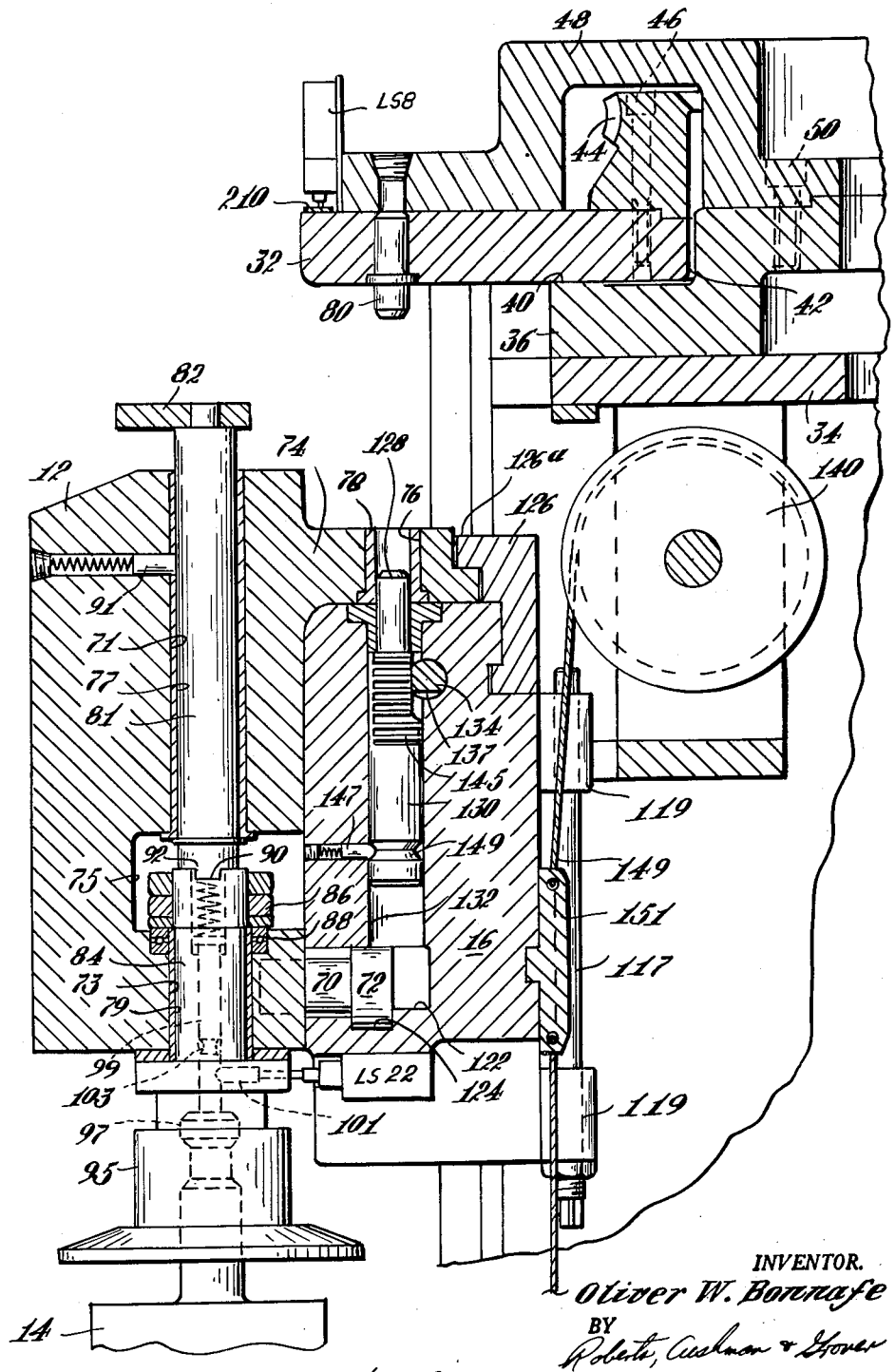
FIG. 6 is a view corresponding to FIG. 5, with the carriage shown part way down.
Figures 9, 10:
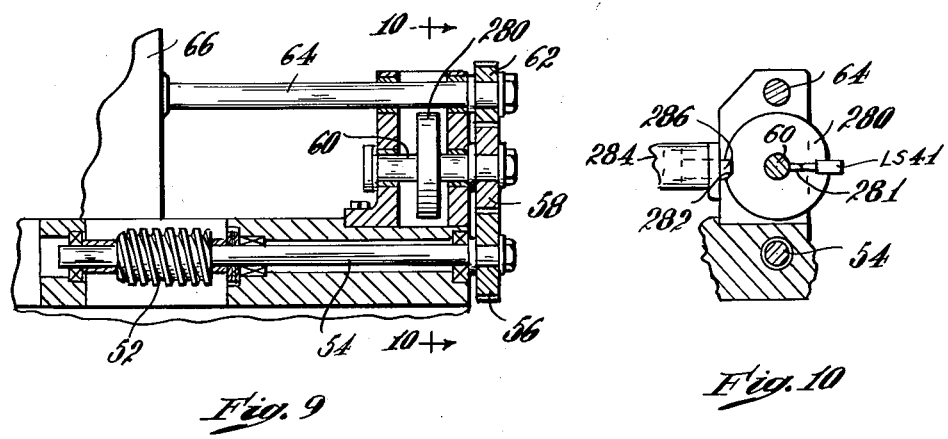
FIG. 9 is a fragmentary vertical section taken on the line 9—9 of FIG. 3.
FIG. 10 is a fragmentary vertical section taken on the line 10—10 of FIG. 9.

Referring to the drawings, the machine has a circular track 10, supporting a plurality of hanger blocks 12, with broaches 14 suspended therefrom for movement in unison along the track to an operative position where there is a carriage 16 (FIGS. 1, 5, 6, and 8), onto which one broach at a time may be moved for movement vertically downward into engagement with a puller 18 (FIGS. 1 and 2), designed to pull the broach through the work to be operated upon, the latter being supported on a bed 20 (FIG. 1, 2 and 2a), and then to return it to its initial position for movement from the carriage onto the track, and movement of the next broach onto the carriage. The track 10 is supported on the outer side of a vertically disposed, substantially cylindrical shell 22, the lower end of which is adapted to rest upon the upper end of a casing 24 (FIG. 2), sunk into a well below the floor level. The track is fastened to brackets 26 (FIG. 1), welded or otherwise secured to the outer side of the shell, and is adapted to support the lower portions of the hangers 12. The upper ends of the hangers are adapted to be supported between a bearing ring 28 which is fastened to brackets 30 (FIG. 1), secured to the shell above the brackets 26, and an index table 32, mounted at the top of the shell for rotation about a vertical axis. To this end, a stiff annular plate 34 is welded or otherwise fastened to the upper end of the shell for supporting a bearing ring 36, which is fastened thereto by bolts 38. The bearing ring 36 has a horizontal supporting surface 40 and a vertical guiding surface 42, upon which the index table rests for rotation. Rotation of the index table is effected by a worm gear 44 fastened to the inner edge of the table by bolts 46. A cap ring 48 (FIGS. 1, 5 and 6), is fastened by bolts 50 to the bearing ring 36 (FIG. 1), so as to cover the worm gear and to provide bearing supports for a worm 52 (FIGS. 1 and 9), which meshes with the worm gear and serves to turn the latter and hence the index table. The worm 52 is fastened to a shaft 54, to which there is fixed a gear 56. The gear 56 (FIG. 9) meshes with an idler 58 on a shaft 60, the latter being parallel to the shaft 54. The idler, in turn, meshes with a gear 62 fast to a shaft 64, which extends into a gear reduction unit 66. The rear reduction unit 66 has an input shaft 68 connected to a hydraulic motor M (FIG. 3). It is thus possible to effect rotation of the index table by supplying fluid pressure to the motor M.

Figure 1:
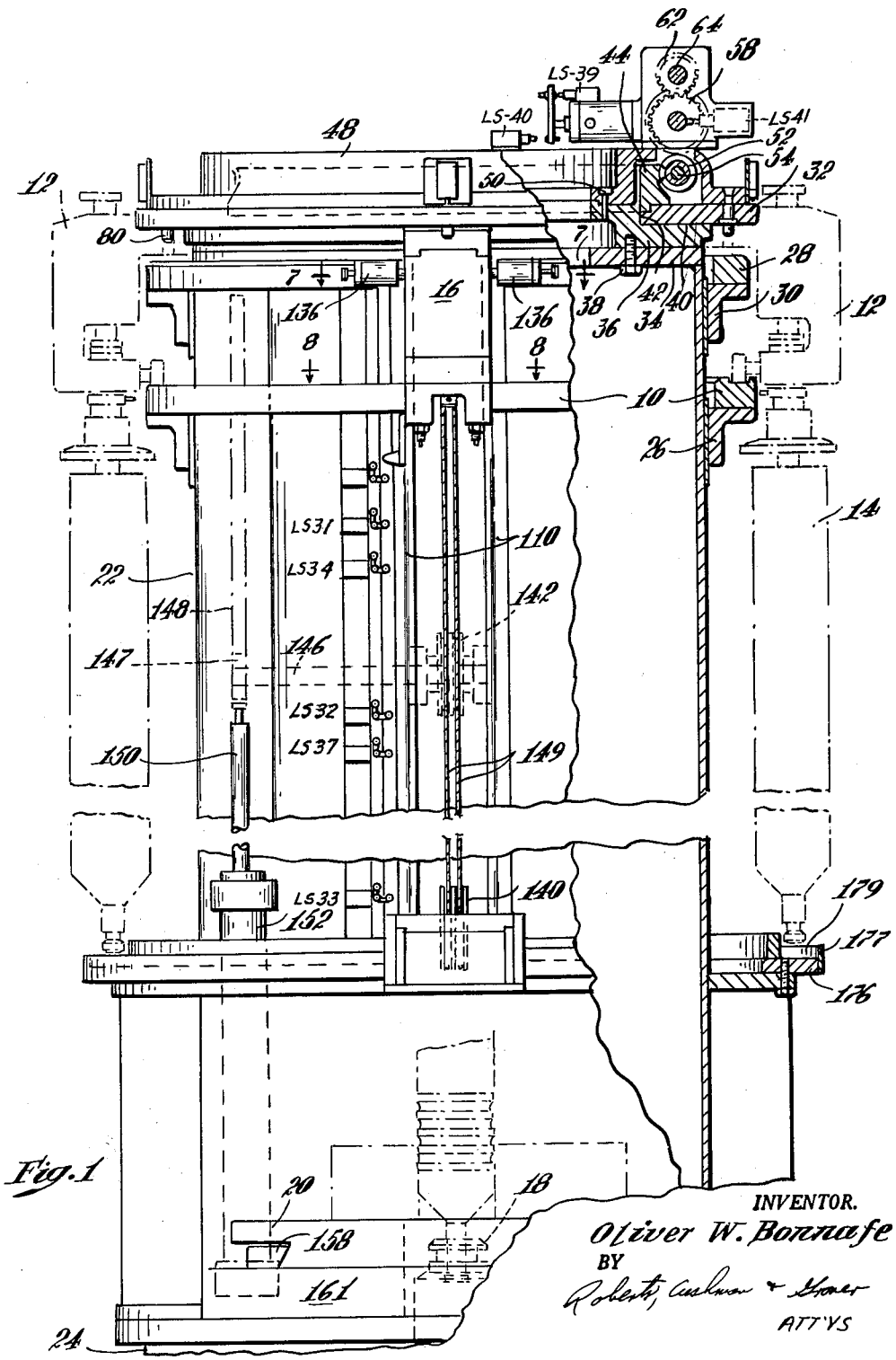
FIG. 1 is an elevation partly in section of that portion of the machine above the floor level, facing that side of the machine where the work is operated upon.

The hanger blocks 12 (FIGS. 1, 3 and 5) are mounted externally of the shell 22 on the track 10 for movement around the shell, motion being imparted to the hanger blocks by rotation of the index table 32, as will now appear. Each hanger block 12 (FIG. 5) has near its lower end a pair of spaced parallel, horizontally projecting stub shafts 70—70 (FIG. 8), on which there are rollers 72—72, the rollers being adapted to rest in the track 10. Near the upper end of each hanger block there is an inwardly projecting arm 74 (FIGS. 5 and 6) which parallels the shafts 70—70 and which is adapted to be engaged between the lower side of the index table 32 and the upper side of the bearing ring 28 (FIG. 1). Each arm contains a vertical hole 76 (FIGS. 5 and 6), lined with a bushing 78. A plurality of downwardly projecting pins 80 are mounted on the underside of the index table, there being as many pins as there are hanger blocks and these pins 80 are uniformly spaced about the index table so as to engage the holes 76 in the hanger blocks and thus to hold the hanger blocks positioned for movement with the index table around the outer side of the shell, to advance the hangers toward the operative position onto the carriage.

The broaches are suspended in a predetermined position while being moved along the track toward the carriage 16, however, they may be turned to a position at right angles thereto as they are moved onto the carriage in the event that the workpiece to be broached requires it. Accordingly, there is means arranged adjacent the carriage which is selectively operable to rotate each broach as it is moved onto the carriage. For suspending the broaches for rotation, each hanger block 12 contains a vertical passage 71 (FIGS. 5 and 6), at its upper part, an axial aligned, vertical passage 73 at its lower part, and an intermediate opening 75. The passages 71 and 73 are lined with suitable bushings 77 and 79 respectively. A spindle 81 is disposed in the passage 71 with its lower end projecting into the opening 75 and its upper end projecting from the top of the block. The upper end of the spindle has secured to it a two-lobe cam 82. A spindle 84 is disposed in the passage 73 with its upper end projecting into the opening 75 and is supported therein by collars 86 fastened to its upper end, which rest on a bearing ring 88 recessed at the bottom of the opening. The adjacent ends of the spindles 84 and 81 have respectively, a slot and tongue 90 and 92 which are interengaged so that rotation imparted to the spindle 81 will turn the spindle 84. A slide bar 94 (FIG. 3) is mounted on the cap ring 48 close to the side of the carriage toward which the hangers approach, to which there is secured a downwardly projecting pin 96. When the slide is retracted the cams 82 will move by the pins 96, as the hangers move onto the carriage, without engagement therewith, however, when the slide bar is advanced the pin 96 will intercept the cams 82, thereby turning the broaches about their axes. A second fixed pin 98 is mounted on an arm 100 at the far side of the carriage in a position to intercept any cam that has been rotated by the first pin, so as to rotate the cam and hence the broach back to its initial position as it moves off the carriage onto the track. A spring-pressed detent 91 holds the spindle in one or the other of its two positions.

The lower end of the spindle 84 (FIG. 5) projects downwardly from the hanger block and supports a clamping head 95 which is adapted to receive the upper end 97 of the broach 14 and to hold the latter in suspension for movement to and from the puller which is located therebelow. In accordance with conventional construction, there is spring-actuated clamping means within the clamping head 95, normally engaged with the head 97 of the broach which, however, may be released by pressure at the appropriate time to permit disengaging the end of the broach therefrom to allow the broach to be drawn through the work. A spring-pressed pin 99 is mounted axially within the spindle 84 for detecting the presence of the head 97 of the broach. When the broach is in place the head 97 holds the pin 99 elevated. In its elevated position the pin 99 engages the plunger 101 of the switch LS22 in the control circuit, which will be described hereinafter. Actuation of the switch LS22, by the presence of the broach, will permit the index table to move to the next position. If the broach is not present the pin 99 will move downwardly and the plunger 101 will enter a notch 103, thus opening the switch and preventing rotation of the index table.

Figure 7:
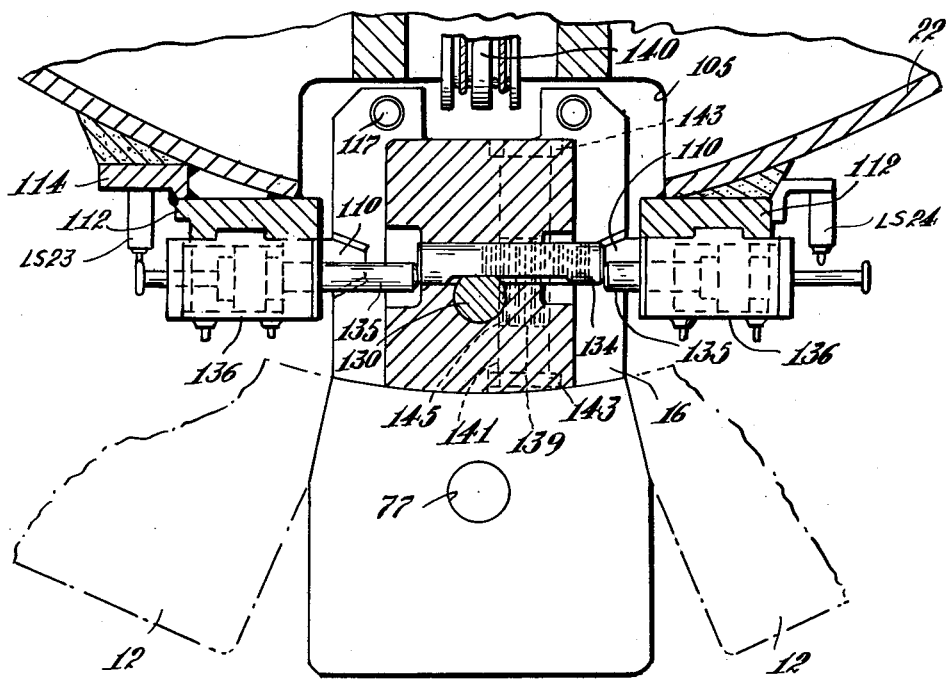
FIG. 7 is a fragmentary horizontal section taken on the line 7—7 of FIG. 1.
Figure 8:
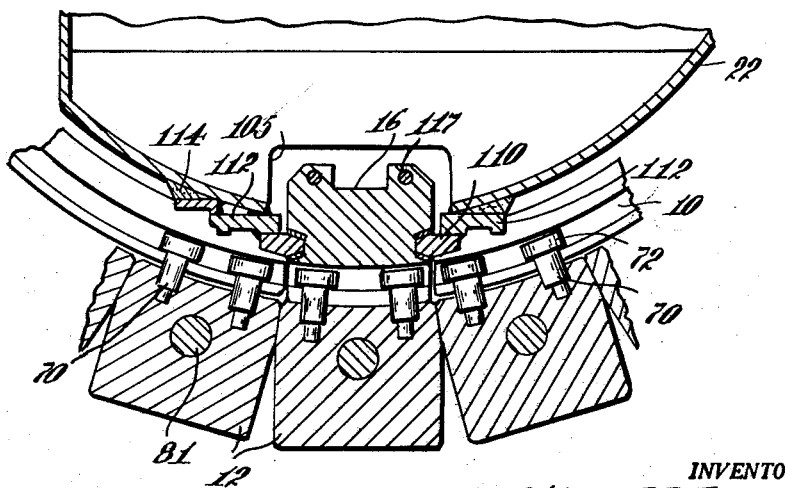
FIG. 8 is a fragmentary horizontal section taken on the line 8—8 of FIG. 1.

The carriage is supported in an opening 105 in the shell 22 (FIG. 7), spaced from the underside of the index table, by adjustable positioning spindles 117, between vertically disposed spaced parallel tracks 110—110 (FIGS. 1, 7 and 8), fastened to the shell at each side of the opening by stiffening plates 112 and 114 welded to the shell. The spindles 117 are mounted in vertically spaced bosses 119—119, at the rear side of the carriage block, the lower ends being threaded into the boss and being provided with multi-sided heads 121, adapted to receive a wrench so that the heightwise position of the spindle may be adjusted by rotation. A lock nut 123 is mounted on each lower end of the spindle and may be tightened against the lower boss to hold the spindle in an adjusted position. The upper ends of the spindles, by engagement with the underside of the plate 34, limit the uppermost travel of the carriage.

The carriage 16 has near its lower end an outwardly facing opening 122 (FIGS. 5 and 6), in which there is a track 124 corresponding to the track 10. The track 124 forms a continuation of the track 10, when at the same level, so that the hanger blocks 12 may be moved from the track 10 onto the carriage. By adjusting the spindles 117 the heightwise position of the carriage block may be adjusted so that the track 124 is at the same level as the track 10. The vertical depth of the carriage block is such, that when the wheels 72—72 are engaged with the track 124, the arm 74, at the upper part of the hanger block, engages the top of the carriage block. A guide block 126 (FIGS. 5 and 6) is fastened to the carriage block to guide the rear end of the arm 74 as the hanger block moves onto the carriage and has a shoulder 126a adapted to overlie the rear end of the arm, thereby to hold the arm down against the top of the carriage and hence to prevent the hanger block from tipping outwardly.

The carriage is adapted to move downwardly to lower the broach toward the puller and work therebelow and, as it is moved downwardly, the arm 74 is disengaged from the pin 80 at the lower side of the index table. To insure against any possibility of disengagement of the hanger block 12 from the carriage in spite of the overlying shoulder 126a, a locking pin 128 is mounted on the carriage for movement upwardly therefrom into the opening 76, before the arm is disengaged from the pin 80. The locking pin 128 is an axial extension of a rod 130 which occupies a vertical passage 132 in the carriage block. The rod 130 is normally held retracted so that the locking pin 128 is flush with the top of the carriage. When a hanger block 12 is moved onto the carriage, however, the rod 130 is moved upwardly to engage the locking pin 128 within the opening 76. This is accomplished by means of a rod 134 which is arranged transversely of the carriage block and is movable horizontally therein by pins 135 (FIG. 7), projecting from cylinders 136 (FIG. 12), arranged one at each side of the carriage block opposite the ends of the rod 134. The rod 134 has teeth 137 which engage a gear 139 on a shaft 141 (FIG. 7), arranged at right angles to the rod 134, with its ends rotatably disposed in bearings 143—143. The gear 139 meshes with a rack 145 on the rod 130 and hence by movement of the rod 134 back and forth the pin 128 may be elevated or lowered. A spring-pressed detent 147 is engageable with a notch 149 on the rod 130, to hold the rod in an up position, since the rod 135 is withdrawn as soon as it displaces the rod 130 so as to be out of the way to permit the carriage to descend.

Figure 12:
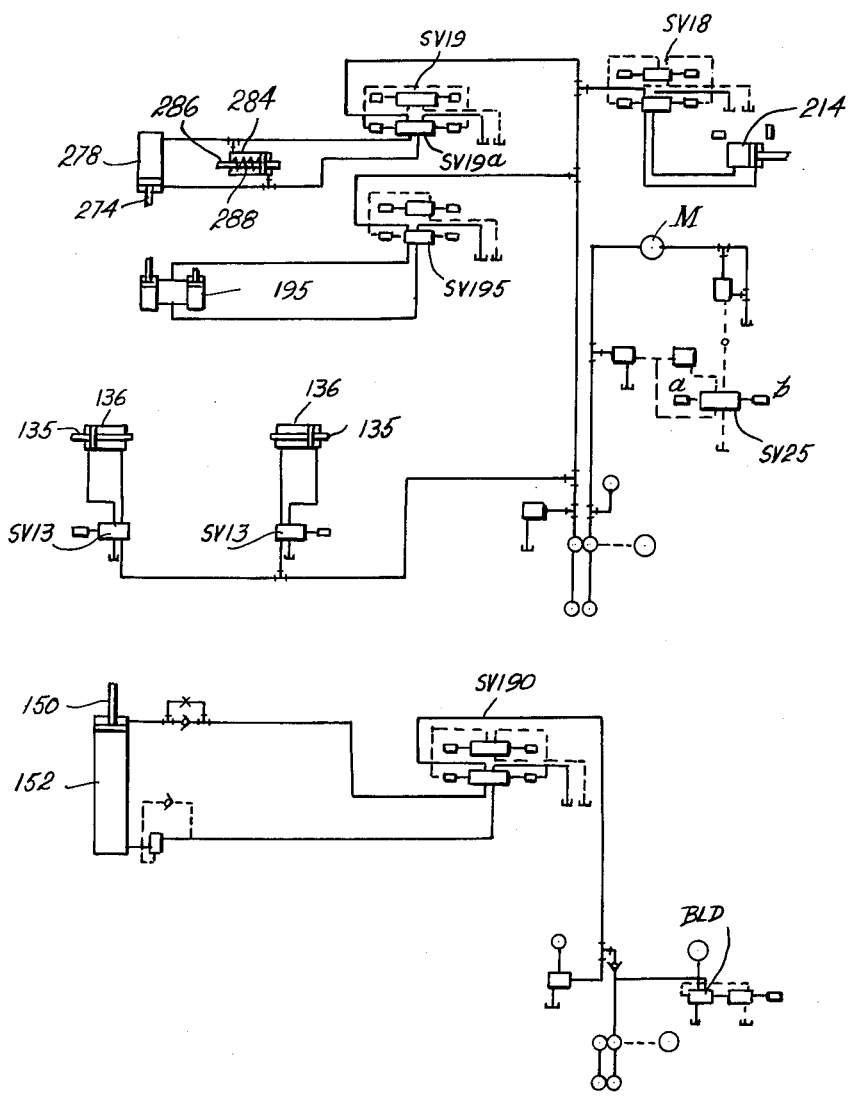
FIGS. 12 and 13 show the fluid pressure system.

After a hanger 12 has been moved onto the carriage 16 and has been locked thereon, by engagement of the locking pin 128 with the hole 76, the carriage is moved downwardly so as to lower the lower end of the broach supported by the hanger through the work, into engagement with the puller 18 (FIGS. 1 and 2), below the work. Movement of the carriage is effected by cables 149 (FIGS. 1, 5 and 6), the ends of which are fastened to a block 151, which in turn is fastened to the carriage 16. The chains 149 are entrained about vertically spaced pulleys 140, which are far enough apart to permit the carriage to travel the distance required to move the lower end of the broach into engagement with the puller 18, the latter being supported within the case 24 for vertical movement, as will subsequently appear. The cables 149 are engaged with driving pulleys 142 (FIG. 1) and a cable tightener (not shown). The driving pulleys 142 are fastened to a shaft 146. A gear 147 is fastened to the shaft 146 and is driven by a rack 148 meshing therewith, which in turn is moved vertically by a piston rod 150 projecting from the upper end of the carriage cylinder 152 (FIG. 12). The cylinder 152 is supported upright within the lower part of the shell and is supplied with operating fluid by way of a solenoid-operated valve SV190 (FIG. 12).

The bed 20, on which the work is clamped (FIGS. 1 and 2), is mounted for sliding movement forwardly and rearwardly between spaced parallel gibs 158—158 on a base plate 161. Movement of the bed 20 is effected by a pair of cylinders 162—162 (FIGS. 2a and 13) connected to the bed by rods 163—163. Fluid is supplied to the cylinders 162—162 by a solenoid-operated valve SV17. The work bed and base have vertically disposed openings 164 and 166 through them, the latter being fixed in alignment with the path of movement of the puller 18. The work to be operated upon is clamped to the work bed 20 in appropriate manner while the latter is retracted so as to be centered with respect to the opening 164. The bed is now moved back beneath the broach so that the openings 164 and 166 are in alignment.

Figure 13:
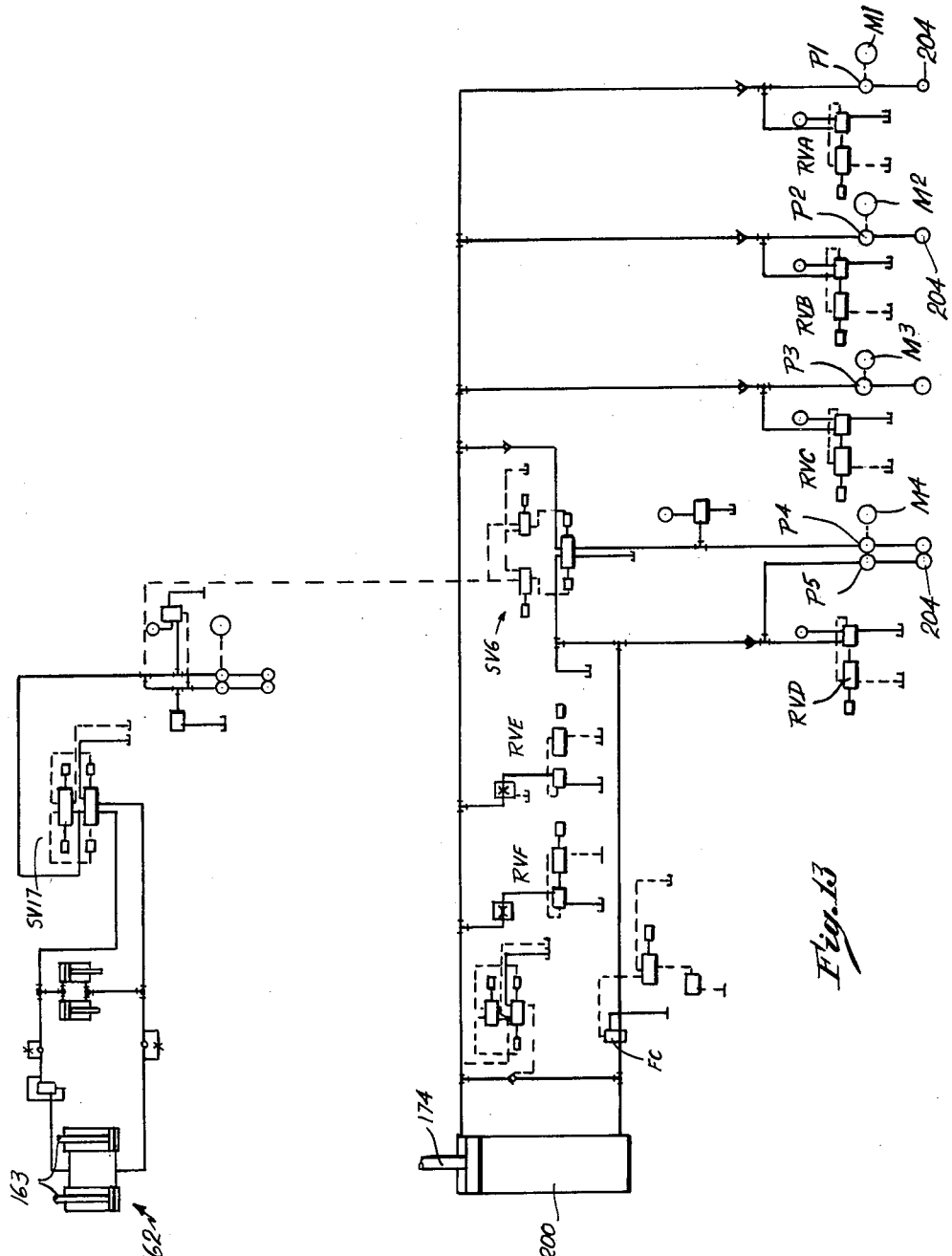

The puller 18 is supported below the work bed for vertical movement in a position to receive the lower end of the broach as it is lowered through the work into engagement therewith. As shown, the puller is attached to a slide 170 (FIG. 2), mounted between vertically disposed, transversely spaced parallel tracks 172—172 within the casing 24. The slide is connected to the upper end of a draw bar 174 (FIGS. 2 and 13), the lower end of which is connected to a piston in the main draw bar cylinder 200 (FIGS. 2 and 13). Fluid is supplied to the main cylinder 200 by a solenoid-operated valve SV6. There are switches LS29, LS25, and LS26 along the casing 24, operable by engagement with switch actuators on the slide, which form part of the control circuit, as will be described hereinafter. There are also switches LS31, LS34, LS32, LS37 and LS33 on the shell 22, operable by movement of the carriage.

There are twenty-one hanger blocks 12 supported around the shell, each of which supports a broach. The broaches are arranged in such fashion that they may be moved successively into position on the carriage for operation on the work to produce the desired roughing and finishing cuts. The total number of broaches may be varied and the number of broaches for any given shaping operation may be varied.

To prevent accidentally dropping the broaches to the floor, in the event that the clamp at the upper end of the broach releases it, an annular shoulder 176 (FIG. 1) is fastened to the shell at the lower ends of the broaches so that, if a broach is dropped free, its lower end will fall upon the shoulder. The distance between the lower end of the broach and the shoulder 176 is sufficiently short so that even if the upper end of the broach slips out of its clamp, its upper end will still rest against the lower part of the clamp and hence will be held upright, resting on the shoulder 176. A ring 177 is disposed peripherally of the shoulder 176 so as to provide an annular groove 179 for receiving and retaining oil which may drip from the lower ends of the broaches.

Figure 11:
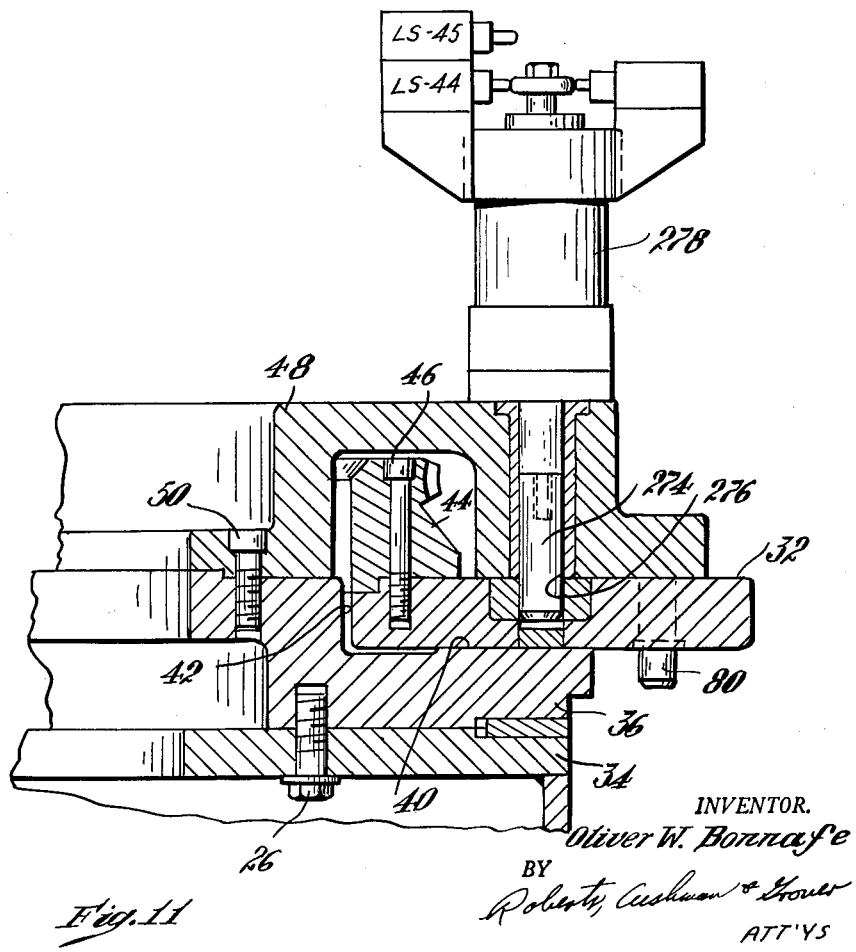
FIG. 11 is a fragmentary vertical section taken on the line 11—11 of FIG. 3.

When a broach has been moved onto the carriage the index table is locked in position by a positioning pin 274 (FIG. 11), which is mounted diametrically opposite the carriage on the cap ring 48. The lower end of this pin 274 is adapted to engage one of a plurality of holes 276 in the index table, of which there are twenty-one, one for each hanger block. The pin 274 is connected to a piston in a cylinder 278 mounted on the cap ring. In order to bring the index table to a stop so that the pin 274 is registered with the hole 276 with sufficient accuracy to permit the pin to enter the hole, a single revolution disc 280 (FIGS. 9 and 10) is mounted on the gear shaft 60. The disc 280 contains in its peripheral surface a notch 282. A cylinder 284 (FIG. 3) is mounted on the cap ring next to the disc 280 and contains a piston carrying a bolt 286, which may be moved thereby into engagement with the notch in the disc or retracted therefrom. The bolt 286 is yieldingly held engaged with the surface of the disc by a spring 288 (FIG. 12) and is beveled at one side so that it will enter the notch easily, but when forced to the bottom of the notch will bring the table to a stop with the pin 274 accurately aligned with the hole 276, even though there is some backlash in the drive. Engagement of the pin 274 with the hole 276 insures the alignment of the lower end of the hole 76 with the pin 128 on the carriage.

The operator prepares the machine for a cutting operation by first deciding upon the cutting speed, that is, the speed at which the broach is to be drawn downwardly by the puller 18 through the work, which downward movement is effected by the hydraulic cylinder 200 (FIGS. 2 and 13), as previously explained.

Referring to FIG. 13, there are four motors M1, M2, M3 and M4, and these drive, respectively, pumps P1, P2, P3, P4 and P5, the last motor M4 driving two pumps, P4 and P5. For low speed operation only the motor M4 is used which drives the pumps P4 and P5. The cutting speed may be increased, however, by operating each of the motors in succession and their pumps to increase the flow of oil to the main draw bar cylinder 200. For slow speed the motor M4 drives the pump P4 which delivers oil through the right end of the solenoid operated valve SV6 and the conductor leading to the top of the main cylinder 200. While the pump P5 is being driven at the same time, the relief valve RVD is open so that the volume of oil pumped by the pump P5 merely circulates back to the sump. As for the oil delivered by the pump P4, part of it is bypassed back to the sump through each of the relief valves RVE and RVF which are normally open. The pump P4 has a capacity of 57 gallons per minute and the relief valves RVE and RVF return 16 gallons a minute each to the sump, so that 25 gallons per minute is delivered to the upper end of the cylinder 200 and this operates to drive the piston downwardly in the cylinder at the rate of 2 feet per minute, which is the lowest speed operation indicated on the dial. By closing the relief valve RVE, so as to prevent bypassing oil through it, 16 gallons may be added to the flow to the upper end of the cylinder 200 and this will increase the speed of operation 2 feet per minute. Correspondingly, by closing the valve RVF another 2 feet per minute may be added to the speed of movement of the piston, thus bringing it up to 6 feet per minute. From 6 feet per minute to 9 feet per minute, the valves RVE and RVF are closed, and the motor M3 is started. This delivers an additional 57 gallons per minute from the pump P3, which added to the 57 gallons delivered by the pump 4 minus the 32 gallons bypassed through relief valves RVE and RVF, produces a speed of 9 feet per minute. By closing the valve RVE the speed may be raised to 11 feet per minute and by closing the valve RVF the speed may be raised to 13 feet per minute. The remaining pumps, P2 and P1, may be added in a corresponding manner to obtain increases of speed up to 27 feet per minute. The oil from any pump may be bypassed, if desired, without stopping its motor through the several relief valves RVA, RVB and RVC. The pump P5 is only used in conjunction with the pump P4 for returning the piston to the top of the main cylinder 200. The solenoid-operated valve SV6 is actuated to permit oil to flow through its left end from the pump P4 into the line extending to the lower end of the cylinder 200 and oil from the pump P5 to join the oil from the pump P4, thereby providing for rapid ascent of the piston. To permit rapid venting of the oil at the top of the piston, it is circulated from the line at the top of the cylinder to the line at the bottom of the cylinder through a check valve. A flow control valve FC in the lower line, prevents oil from leaking out from the lower end of the cylinder when the machine is at rest.

Figure 15:
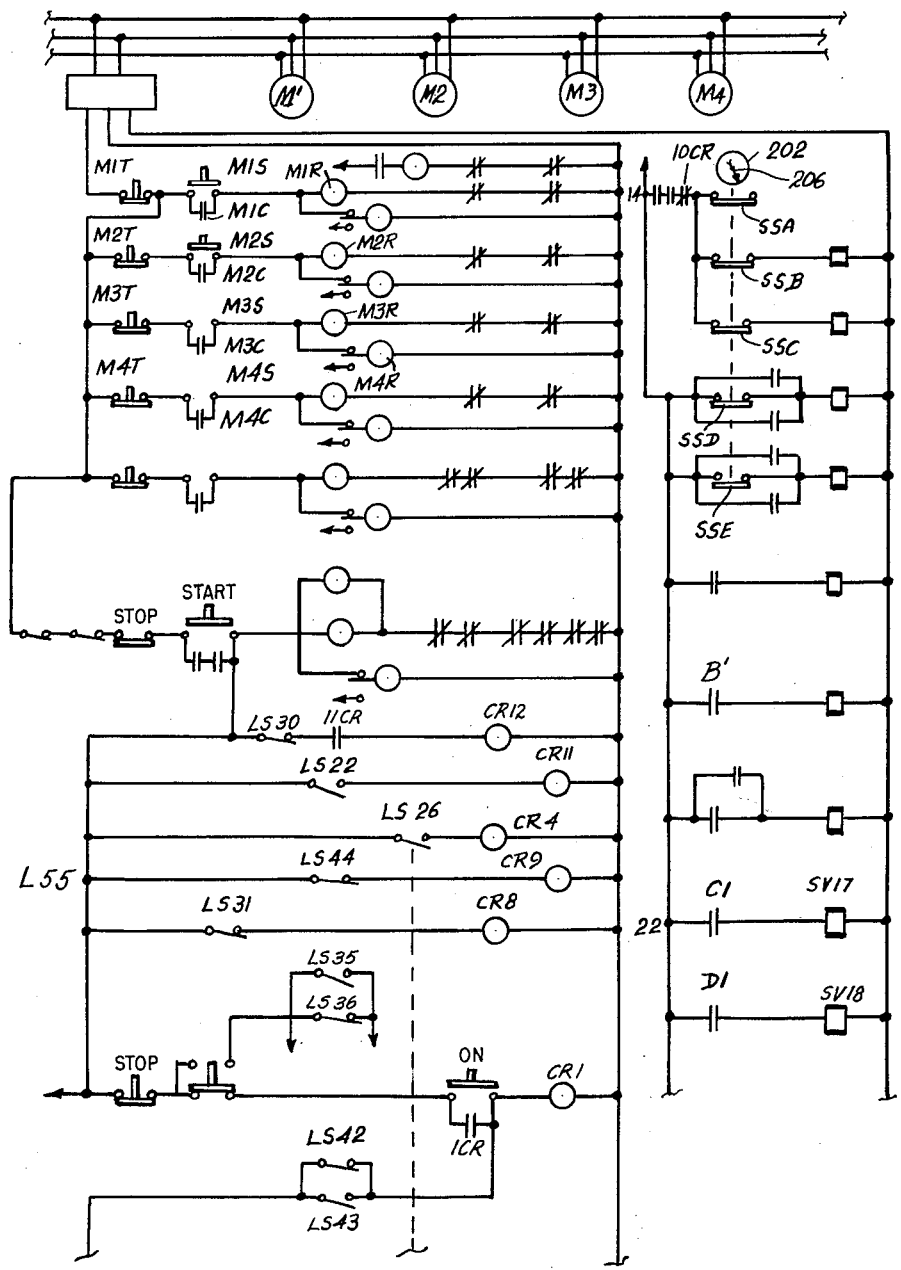

As shown in FIG. 15, a selector switch 202, which has a pointer 206 movable relative to a scale marked with the feet per minute available for the cutting operation, is provided. Rotation of the pointer controls energization of the relief valves RVA to RVF, inclusive. When all of the relief valves are closed and all of the pumps running maximum pressure is delivered to the cylinder 200.

Figure 14:
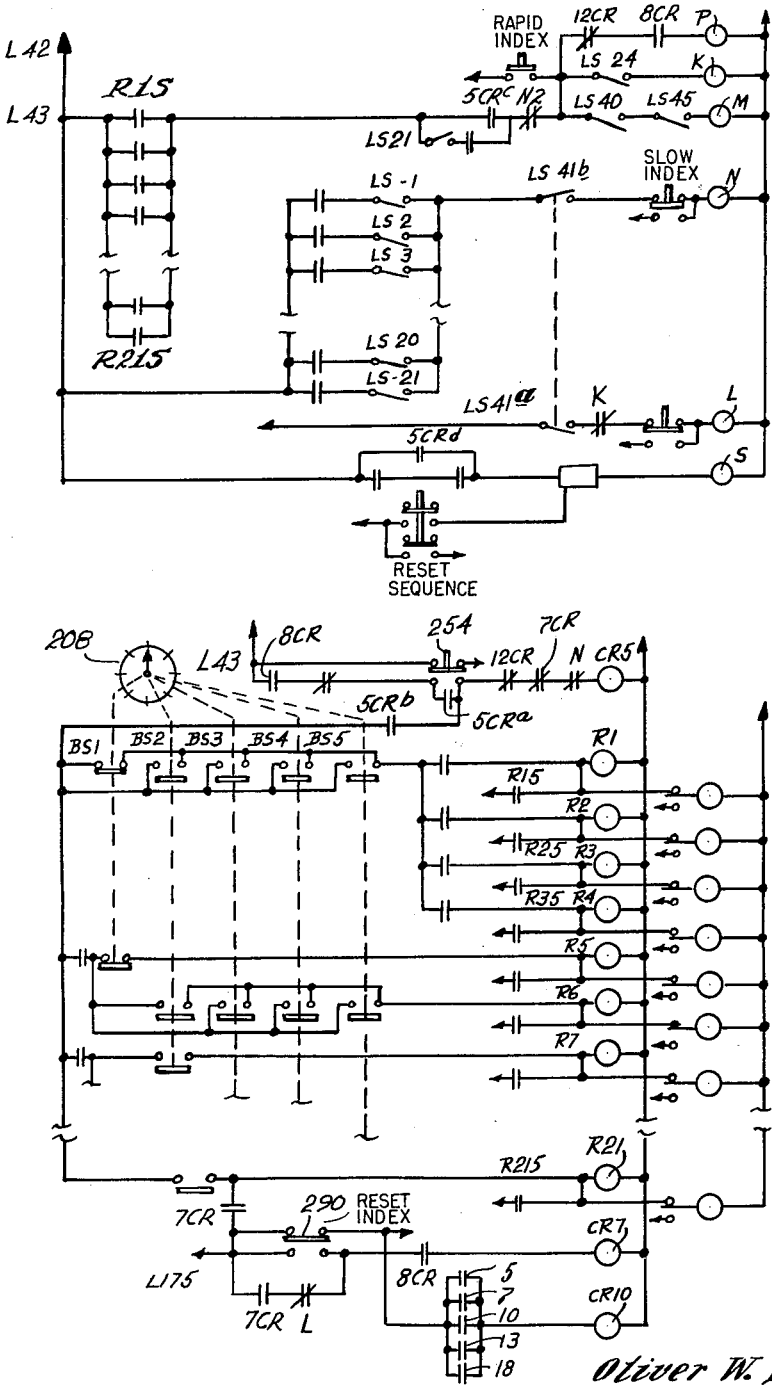
FIGS. 14, 15 and 16 show the electrical system diagrammatically.

Having set the cutting speed the hole size is decided upon and selected by a hole size selector switch 208 (FIG. 14). Each hole size is determined by using a predetermined group of broaches in a given sequence. For example, for a hole 2⅜ x 2¾, broaches 1, 2, 3, 4 and 5 are selected, broach 5 being the finish broach. If a 2⅜ inch hole is to be made, broaches 1, 2, 3, 4, 6 and 7 are selected, broach 7 being the finish broach. The following table shows the hole sizes available and the broaches used therefor:

Hole size:
```
  2⅜ x 3¾ _____ 1, 2, 3, 4, 5
  2⅜ x 3 _____ 1, 2, 3, 4, 6, 7
  2⅜ x 3⅝ _____ 1, 2, 3, 4, 6, 8, 9, 10
  2⅜ x 4¼ _____ 1, 2, 3, 4, 6, 8, 9,
                          11, 12, 13
  2⅜ x 5½ _____ 1, 2, 3, 4, 6, 8, 9,
                          11, 12,
                          14, 15, 16, 17, 18
  3 x 5½ _____ 19
  3 x 7¾ _____ 20
  Spare _____ 21
```

It will be observed that broaches 1, 2, 3 and 4 are used every time regardless of the hole size and that larger hole sizes are obtained by adding broaches to the first four. At stations 19, 20 and 21 only one broach is used as indicated by the table above.

The hole size selector switch 208 is connected through suitable mechanical linkage so that by rotating it one of a set of switches BS1 to BS5 is selected. Each of the switches energizes the first four relays R1 to R4 of a series of relays R1 to R21, corresponding to the entire number of broaches and, in addition, each energizes additional relays according to the table above. Thus, BS1 energizes relays R1 to R4 and, in addition, relay R5. BS2 energizes relays R1 to R4 inclusive, and, in addition, R6 and R7, skipping relay R5. BS3 energizes the first four relays, skips R7 and energizes R8, R9 and R10. BS4 energizes the first four, skips R5, energizes R6, skips R7, energizes R8 and R9, skips R10 and energizes R11, R12 and R13. The relays R1 to R21, through corresponding switches R1S to R21S energize relay CR10, which closes switch 10CR in line L14 containing the selector switch 202 for the cutting speed. The switches R1S to R21S (FIG. 14), are connected to limit switches LS1 to LS21 (FIG. 14), the latter being fixed to the cap ring above the index table (FIG. 3) and corresponding in number to the broaches. These limit switches are actuated by a cam 210 (FIG. 5) on the index table as the table turns so as to slow the table down preparatory to stopping a broach at the carriage, as will more fully appear hereinafter. Only the limit switches which have been preselected by setting of the hole size selector switch 208 will function.

Prior to initiating operation of the machine, the positioning pin 274 (FIG. 11) is engaged with the index table and hence limit switch LS44, line L55 (FIG. 15) is closed and limit switch LS45, line L43 (FIG. 14) is open. When bolt 286 is engaged with the notch 282 (FIG. 10), in the disc, the limit switch LS41a (FIG. 14) is closed and limit switch LS41b is open. The nub 281 on the disc shaft, by engagement with limit switch LS41, once each revolution, actuates the limit switches LS41a and LS41b as stated above. Limit switch LS39 (FIGS. 1 and 16) is also closed while the limit switch LS40 (FIGS. 1 and 14) is open. Moreover, since the locking pin 128 on the carriage is in its lower position, limit switch LS32 (FIGS. 7 and 16) is open and limit switch LS24 (FIGS. 7 and 14) is closed. The position of the broach, at broaching position, is effected by closing the broach positioning switch 212 (FIG. 15). In one position, the switch energizes a double-acting solenoid to advance slide 98 and in the other position to retract the slide 98.

Figure 4:
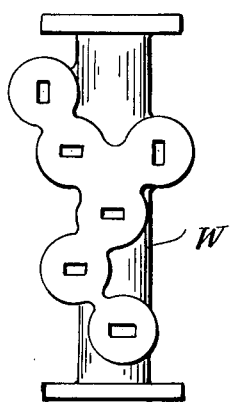
FIG. 4 is a plan view of a valve casing illustrating the the type of work which may be operated upon.

Having set the machine up for the speed of cut, hole size and broach position, the operator now mounts the work piece W, such as the valve case shown in FIG. 4, on the work bed 20 (FIGS. 1 and 2), the latter having been withdrawn from beneath the broaches and depresses one or more of the starting buttons M1S, M2S, M3S and M4S (FIG. 15), which energize corresponding relays M1R to M4R in the motor circuit and the holding contacts M1C to M4C. All motors may be stopped by depressing button M1T. Individual motors may be stopped by depressing one of the several buttons M2T to M4T inclusive. For low speed, only one motor is required. If for some reason it is desirable, after having started one or more of the motors, to stop the machine and start over again, a reset index button 290 (FIG. 14) can be pressed which energizes relay CR7. Energizing relay CR7 opens contacts 7CR so as to de-energize relay CR5. Contact 8CR is open, hence resetting can only be effected when the broach is in an up position.

Figure 16:
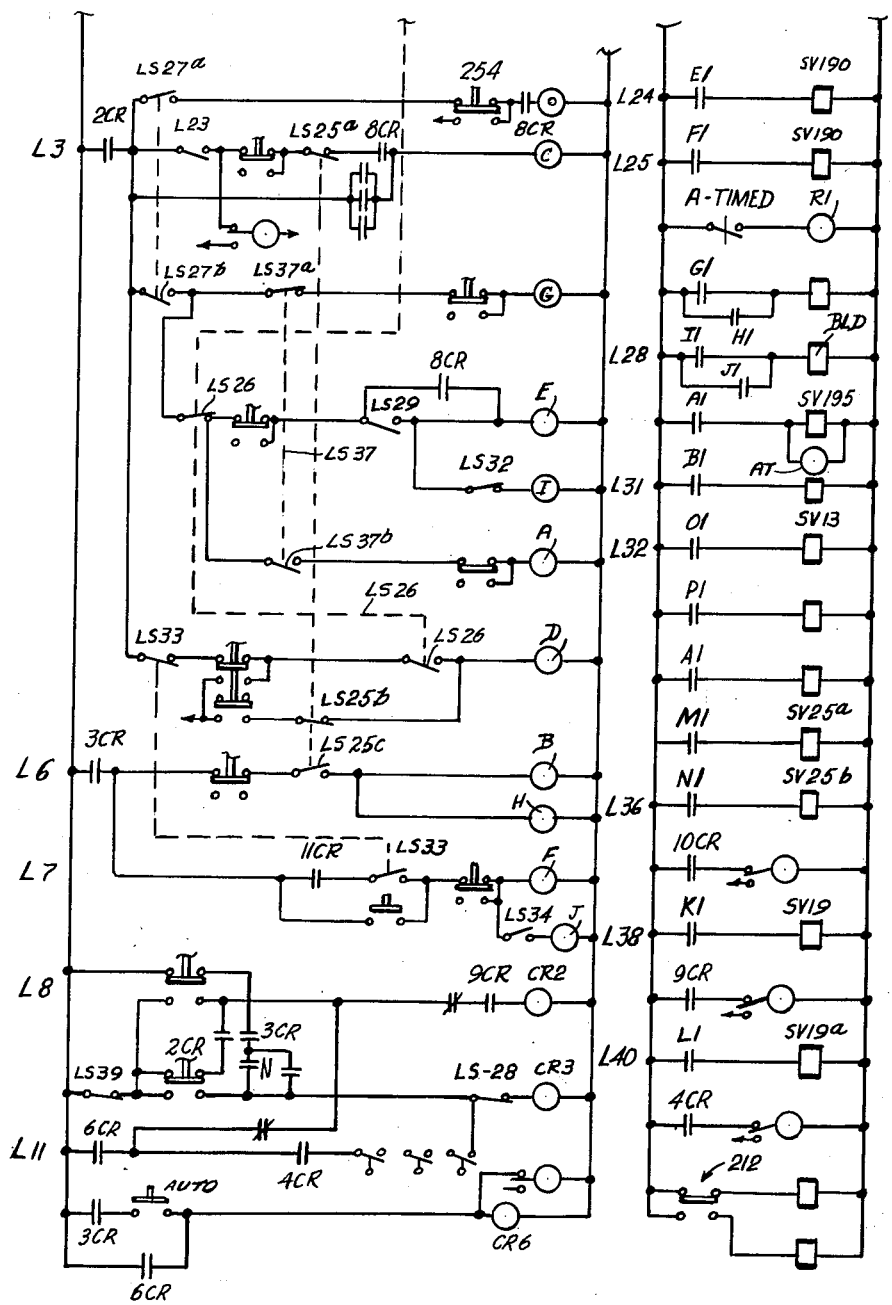

Assuming that the work is ready to be operated upon, index button 254 (FIG. 14) will be pressed to energize relay CR5 which, in turn, closes switches 5CRa to 5CRd inclusive. Relay P is energized by the closing of switch 5CRc and operates to pull the locking pin 128 out. Relay K is energized through limit switch LS24 when the locking pin 128 is pulled out. Relay K closes contacts K1 (FIG. 16), thereby energizing solenoid-operated valve SV19, which controls the flow of fluid pressure to the hydraulic cylinder 278 (FIG. 12) which, in turn, moves the positioning pin 274 out of locking engagement with the hole 276 in the index table and permits flow of pressure fluid to the hydraulic cylinder 284 to retract the bolt 228 from the disc 280, thereby releasing the index table so that it may be turned to move the next broach into position. Retraction of the positioning pin 274 closes limit switch LS45 (FIG. 14) which, in turn, energizes relay M, limit switch LS40 having been closed by retraction of the bolt 228. Energization of relay M (FIG. 14) closes contacts M1 (FIG. 16) for rapid index which actuates solenoid-operated valve SV25a (FIG. 12), so as to feed pressure fluid to hydraulic motor M at full pressure to advance the index table and the broach, next to the carriage, toward the carriage at full speed. As the broach approaches the carriage, however, it is slowed down. This is effected by means of the cam 210 (FIG. 5) on the index table, which operates to close the limit switch of the broach approaching the carriage, that is, one of the switches LS1 to LS21 and since switch LS41b (FIG. 14) is closed, and switch LS41a is open, relay N is energized which thus closes switch N1 (FIG. 16), line L36 for slow index. Switch N1 actuates the solenoid-operated valve SV25b to slow the table down by closing a relief valve, one of which is set to give slow speed operation. Energizing relay N simultaneously opens switch N2, line L43 (FIG. 14), thereby de-energizing relay K which, in turn, de-energizes solenoid-operated valve SV19, venting the pressure fluid from the cylinder 284, so that the bolt is held against the cylinder solely by the spring 288 at the left end of the cylinder. As the bolt moves into the notch, switch LS41 is engaged by the nub 281 so as to open switch LS41b and close switch LS41a. This energizes relay L (FIG. 14) and this, in turn, closes switch L1, line L40 (FIG. 16), to energize the locking solenoid SV19a of the solenoid-operated valve SV19, in such fashion as to allow the pressure fluid to enter the left end of the cylinder 284 and force the bolt into the disc. At the same time, pressure fluid is fed to the positioning cylinder 278 to press the positioning pin 274 into the hole 276 in the index table. As the positioning pin 276 is pushed into locking position, limit switch LS44 (FIG. 15) is closed and LS45 (FIG. 14) is opened and this energizes relay CR9 (FIG. 15). Relay CR9 closes switch 9CR, line L8 (FIG. 16) which, in turn energizes relay CR2, line L8. Relay CR2 closes contacts 2CR which starts sequence for the descent of the carriage and the cutting stroke of the broach puller. Closing contacts 2CR energizes relay O (FIG. 16) which closes contacts O1. Closing contacts O1 energizes solenoid-operated valve SV13 (FIG. 12) which moves the actuating pin 135 to the right to raise the locking pin 128 into the lower end of the hole in the arm 74. At the same time the switch LS23 (FIG. 7) is closed. Closing switch LS23 energizes relay C which closes contacts C1. Closing contacts C1 energizes solenoid-operated valve SV17 (FIG. 13) which initiates movement of the work supporting bed 20 into broaching position by supplying fluid pressure to the cylinder 162 (FIG. 13). When the bed reaches broaching position it closes switch LS27b which energizes relay G, thereby closing contacts G1. Closing contacts G1 energize solenoid-operated valve RVD (FIG. 13) which supplies oil to the bottom of the cylinder 200 to raise the piston 174. This raises the puller up into the opening 166 in the underside of the bed. Engagement of the puller jaws within the opening at the underside of the bed closes switch LS29. Closing switch LS29 energizes relays E and I. Relay E closes contacts E1. Closing contacts E1 energizes solenoid-operated valve SV190 (FIG. 12). Relay I closes contacts I1. Closing contacts I1 energizes valve BLD (FIG. 12), thereby to supply additional oil for rapid descent of the carriage. Decent of the carriage actuates switch LS32 (FIG. 16) which de-energizes relay I and opens contacts I1. Opening contacts I1 de-energizes valve BLD (FIG. 12) thereby bypassing part of the oil so that the carriage continues down at a decelerated speed until it actuates switch LS37 at a stall point in contact with the puller. Switch LS37 is actuated at the stall point and energizes relay A which closes contacts A1. Closing contacts A1 energizes solenoid-operated valve SV195 (FIG. 12) which supplies oil to the cylinders 195 to close the jaws at the upper end of the puller on the lower end of the broach. Closing contacts A1 also starts a time delay relay At to give the jaws time to close on the lower end of the broach. Relay At closes contacts A-timed which, in turn, energizes relay R1. Relay R1 closes contacts R1—1 which energizes solenoid-operated valve SV6 which starts the main slide for the puller on its down stroke by delivering oil to the upper end of the cylinder 200. The carriage continues to move downwardly with the broach until it hits a stop against which the jaws are pressed and mechanically opened to release the upper end of the broach. At this point, the slide closes switch LS26 (FIG. 15). Switch LS26 energizes relay D thereby closing contacts D1. Closing contacts D1 energizes solenoid-operated valve SV17 (FIG. 13), sending oil to the cylinders 162 which move the work bed out of broaching position. The broach is now ready to be returned to its initial position. When the bed reached its outermost position it closed switch LS28 which energized relay CR3. Relay CR3 closed contacts 3CR (FIG. 16). Closing contact 3CR energizes relays B and H. Relay B closes contact B1 and closing contact B1 energizes solenoid-operated valve SV6. Relay H closes contacts H1 and closing contacts H1 energizes solenoid-operated valve RVD. Closing valve RVD adds the oil of the pump P5 to that of pump P4 so as to raise the slide up at full speed. Contacts B also energize solenoid-operated valve SV195, to supply oil to the cylinder 195 to open the jaws at the upper end of the draw bar to release the lower end of the broach. The main slide continues upwardly and forces the upper end of the broach into the jaws on the carriage which open mechanically by the pressure applied to them and lifts the carriage bodily until switch LS33 is actuated by such movement. Switch LS33 energizes relays F and J which close respectively, contacts F1 and J1. Contact F1 energizes solenoid-operated valve SV190. Contact J1 energizes valve BLD so that the carriage moves up at full speed. Near the upper end of its movement the carriage operates switch LS34 which de-energizes relay J. Contacts J1 open, de-energizing valve BLD and the carriage slows down and comes to a stop at the top. At the top of the carriage actuates switch LS31 which energizes relay CR8 (FIG. 15), closing contacts 8CR (FIG. 14). Closing contacts 8CR make it possible to re-energize the circuit by pressing the index button 254 to initiate the next operation.

It should be understood that the present disclosure is for the purpose of illustration only and that this invention includes all modifications and equivalents which fall within the scope of the appended claims.

I claim:
1. In a broaching machine, a plurality of broach hangers, each of which is adapted to hold a broach in suspension, a broach suspended from each hanger, means including an elevated, horizontally disposed circular track supporting the broach hangers for movement therealong about a vertical axis, a work support subjacent the track, a carriage, means supporting the carriage for movement from a position adjacent the track downwardly toward the work support, a puller associated with the work sup- port adapted to engage the lower end of a broach, lowered toward the work support, to pull the broach through work resting on the work support, and means for moving the hangers along said track to advance one at a time onto the carriage, comprising an index table on the supporting means rotatable about an axis concentric with the circular track, means on the index table operably engaged with each hanger to effect movement of the hangers in unison therealong, means for effecting rotation of the index table to move the hangers along the track, means for bringing the index table to a stop with a hanger situated on the carriage, means on the carriage for locking the hanger thereto, and means for effecting downward movement of the carriage to lower the hanger locked thereto and the broach supported thereby toward the work support, downward movement of the carriage operating automatically to disengage the hanger on the carriage from the means on the index table engaged therewith to permit movement thereof with the carriage.

2. In a broaching machine, a plurality of broach hangers, each of which is adapted to hold a broach in suspension, a broach suspended from each hanger, means supporting the hangers for movement along a circular path, a work support subjacent the path of movement of the hangers, a carriage, means supporting the carriage for movement from a position adjacent the path of the movement of the hangers downwardly toward the work support, a puller associated with the work support adapted to engage the lower end of a broach to pull the broach through the work on the work support, and means for moving the hangers along said path to advance one at a time onto the carriage, comprising an index table on the supporting means, rotatable about an axis concentric with the circular path of movement of the hangers, a plurality of pins corresponding in number to the number of hangers fixed to the table with their lower ends projecting into the upper ends of the holes in the hangers, means for effecting rotation of the index table, means for bringing the index table to a stop with a hanger situated on the carriage, a locking pin on the carriage adapted to enter the lower end of the hole in the hanger situated thereon beneath the pin engaged with its upper end, and means for lowering the carriage, the pin on the index table being disengaged from the upper end of the hole by downward movement of the carriage, and re-engaged by return movement of the carriage to its initial position.

3. A broaching machine according to claim 1, wherein there is a broach clamping head including a spindle rotatably mounted on each hanger adapted to hold the broach in suspension, means at the upper end of each spindle, and other means on the support selectively operable to intercept the means at the upper end of each spindle as the carriers move onto the carriage to turn the broaches to predetermined positions, and other means on the support operable on the means at the upper ends of the spindles as the hangers leave the carriage to turn the broaches to their original position.

4. In a broaching machine, a plurality of broach hangers for supporting broaches in suspension, a support along which the broach hangers are movable in a predetermined path, a work support below the hanger support, a puller associated with the work support, a carriage adjacent the path of movement of the broach hangers operable to move a broach hanger with a broach suspended therefrom downwardly toward the puller, and means for effecting movement of the broach hangers comprising an index table rotatable about an axis concentric with the path of movement of the hangers, cooperable locking elements on the hangers and carriage respectively, means on the table operably associated with each hanger to effect movement of the hangers along the track toward the carriage, a locating pin on the supporting means, and means operable when a hanger moves onto the carriage to engage the locating pin with the index table to lock the latter with the locking element on the hanger in registration with the locking element on the carriage.

5. A machine according to claim 4, in which there is means operable to rotate the index table throughout the major part of the distance between successive broach hangers at a rapid rate, and other means operable to decelerate movement of the index table as a hanger nears the carriage.

6. A machine according to claim 4, wherein the index table contains openings, with one of which the locating pin is engaged as each hanger moves onto the carriage, the means for effecting rotation of the index table including a worm wheel fast to the table and a worm gear, and means operable to stop the worm at a predetermined point so as to insure that the locating pin engages an opening in the index table.

7. In a broaching machine, means for supporting a track, a plurality of hangers mounted on the track, each of which supports a broach in suspension, and each of which contains a hole, an index table having a part movable along the track, pins on the index table engageable with the holes in the hangers and operable thereby to effect movement of the hangers along the track as the table is moved, a carriage adjacent the track, said carriage being movable downwardly therefrom and having a locking pin engageable with each hanger as it is moved off the table onto the hanger to secure the hanger thereto for downward movement, a positioning pin on the means supporting the track, said table containing a plurality of holes corresponding in number to the hangers, with which the positioning pin may be engaged to lock the table when a hanger is on the carriage with the locking pin aligned with the hole in the hanger situated on the carriage, and means operable by engagement of the positioning pin with a hole in the table to move the locking pin on the carriage into the hole in the hanger and to initiate downward movement thereof.

8. Apparatus according to claim 7, wherein there is means operable to effect movement of the locking pin into engagement with the hole in the hanger situated thereon, only if the locating pin is engaged with the hole in the index table.

9. A broaching machine according to claim 1, comprising fluid pressure operative means connectable to the pull bar to effect movement thereof, selectively operable means including a plurality of fluid pumps and a bypass valve associated with each fluid pump collectively operable to supply fluid at a maximum pressure to said fluid pressure operable means, and means for selecting certain of the pumps and certain of the bypass valves in combination to effect operation of said fluid pressure operable means at less than full pressure.

10. A broaching machine, according to claim 1, comprising a fluid operable motor for effecting movement of said puller, a plurality of motor driven pumps for supplying pressure fluid at a predetermined pressure to actuate said fluid motor, and means for bypassing the fluid of one or more of the pumps to drive the fluid motor at a lower speed.

11. In a broaching machine, a work support, a puller associated therewith for pulling a broach through work mounted on the support, means supporting a plurality of broaches in suspension for movement one at a time into alignment with the puller, jaws carried by the puller operable to engage the lower end of a broach moved into alignment with the puller, means for lowering the broach to engage the lower end of the broach with the jaws on the puller and means for effecting downward movement of the puller as the lower end of the broach enters the jaws to effect engagement of the jaws with the broach without impact.

12. In a broaching machine, a work support, a puller associated therewith for pulling a broach through the work mounted on the support, means including jaws supporting a plurality of broaches in suspension for movement one at a time into alignment with the puller, a carriage for effecting movement of the support moved into alignment with the puller downwardly toward the puller to engage the lower end of the broach with the puller, motor means for closing the jaws on the puller on the lower end of the broach as the latter is moved into engagement therewith, means for effecting downward movement of the broach to draw the broach through the work, said carriage following downwardly therewith and supporting the broach for linear movement, and means operable, by engagement with the jaws on the carriage as the broach is pulled substantially through the work, to release the jaws at the upper end of the broach and to stop the carriage.

13. In a broaching machine, a work support, a puller associated therewith for pulling a broach through the work mounted on the support, hangers including mechanically disengageable, yieldable jaws supporting a plurality of broaches in suspension for movement one at a time into alignment with the puller, a carriage for effecting movement of the hangers to move a hanger moved into alignment with the puller downwardly toward the puller, means for effecting rapid descent of the carriage, means for decelerating the carriage as the lower end of the broach nears the puller, means for closing the jaws on the puller on the lower end of the broach, means operable, by engagement of the broach with the puller, to initiate downward movement of the puller at full speed and following movement of the carriage so that the broach is supported at both ends during the cutting stroke, means for decelerating the puller as the end of the cutting stroke is neared, and a stop operable, by engagement of the jaws on the hanger, to disengage the jaws, and to stop the carriage so that the broach can pass through the work, said puller stalling at the lower end of its cutting operation, and means operable at stall position to initiate return movement of the broach to its initial position.

14. In a broaching machine, a support having a circular track, broach hangers mounted on the track for movement therealong, each hanger being adapted to hold a broach in suspension, an index table on the support, said table being rotatable and operative to move the hangers along the track, a carriage situated at a point along the track, said carriage having a track section upon which a hanger is adapted to be moved by rotation of the table, means for effecting vertical movement of the carriage to move a hanger and the broach thereon toward the work to be operated on, and means for adjusting the heightwise position of the carriage to bring the track section thereon into alignment with the track on the support.

15. In a broaching machine, a support having a circular track, a plurality of hangers movable along the support, each hanger supporting a broach in suspension, a carriage at one point along the support onto which the hangers are adapted to be moved one at a time, an index table, a worm wheel fast to the table, a worm in mesh with the worm wheel, driving means operable to rotate the table including a hydraulic motor, means coupling the motor to the worm, means for supplying pressure fluid to the hydraulic motor to effect movement of the table at a rapid rate, limit switches on the table corresponding in number to the broach hangers, a cam adjacent the carriage operable to trip each limit switch as the table moves a hanger toward the carriage to decelerate the movement of the table, and means movable into locking engagement with the coupling to stop the table at a predetermined position each time a hanger moves onto the carriage, said hydraulic motor constituting a cushion between the driving means and the last-named means to permit interengagement without damage.

16. In a broaching machine, a circular support, a plurality of hangers movable along the support, each hanger supporting a broach in suspension, a carriage at one point along the support onto which the hangers are adapted to be moved one at a time, an index table, a worm wheel fast to the table, a worm in mesh with the worm wheel, driving means for imparting rotation of the table including a hydraulic motor, means connecting the motor to the worm including a shaft and a clutch disc thereon containing a notch, means for supplying fluid pressure to the hydraulic motor to effect rotation of the table at a rapid rate, limit switches on the table corresponding in number to the broach hangers, a cam adjacent the carriage operable to trip each limit switch as the table moves a hanger toward the carriage to decelerate the movement of the table, and a bolt movable into the notch to stop the table at a predetermined position without backlash in the drive each time a hanger moves onto the carriage, said hydraulic motor constituting a cushion between the driving means and the bolt to permit interengagement without damage.

17. A broaching machine according to claim 16, wherein the bolt is disposed adjacent the clutch disc, there is means yieldably holding the end of the bolt engaged with the surface of the clutch disc so that as the disc rotates the bolt will drop into the notch as the latter comes opposite the bolt, said notch having converging walls and said bolt having correspondingly converging surfaces, and there is fluid pressure operable means for forcing the bolt into the bottom of the notch after it enters the same to stop the worm at a predetermined position.

18. A broaching machine according to claim 16, wherein there are interengageable elements on the support and table, the bolt is disposed adjacent the clutch disc with an end disposed in a position to enter the notch therein, the notch and bolt having interengageable wedge-shaped surfaces which, by engagement, stop rotation of the worm and hence the table with the interengageable locking elements on the support and table accurately aligned, fluid pressure operable means for seating the bolt in the notch and other means operable, by such seating, to interengage the locking elements on the support and table.

19. A machine according to claim 14, in which the locating pin is operable to prevent resumption of rotation of the table until the carriage is returned to its initial position.

20. A broaching machine according to claim 1, comprising fluid pressure operative means connected to the puller to effect movement thereof, a plurality of power-driven means operative to supply fluid pressure to said fluid pressure operative means, said plurality of power-driven means being collectively operable to supply fluid at maximum pressure to said fluid pressure operative means, and means associated with each of said power-driven means selectively operable to bypass the pressure fluid supplied thereby to said fluid pressure operative means to effect operation of said fluid pressure operative means at less than full pressure.

References Cited in the file of this patent

UNITED STATES PATENTS

| 1,437,856 | Myers | Dec. 5, 1922 |
| 1,647,370 | Mitchell | Nov. 1, 1927 |
| 1,932,761 | West | Oct. 31, 1933 |
| 2,106,212 | Halborg | Jan. 25, 1938 |
| 2,363,208 | Sulzer | Nov. 21, 1944 |
| 2,381,998 | Bonnafe | Aug. 14, 1945 |
| 2,711,674 | Abbott | June 28, 1955 |
| 2,859,644 | Watts | Nov. 11, 1958 |